US012808336B2

(12) United States Patent
Kraft et al.

(10) Patent No.: US 12,808,336 B2
(45) **Date of Patent: *Nov. 24, 2026**

(54) GAS TURBINE FIRING TEMPERATURE CONTROL WITH AIR INJECTION SYSTEM

(71) Applicant: Powerphase International, LLC, Hobe Sound, FL (US)

(72) Inventors: Robert J. Kraft, Tequesta, FL (US); Scott Auerbach, Jupiter, FL (US); Sergio A. Arias Quintero, Jupiter, FL (US)

(73) Assignee: Powerphase International, LLC, Hobe Sound, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/263,092

(22) Filed: Jul. 8, 2025

(65) Prior Publication Data

US 2025/0334080 A1 Oct. 30, 2025

Related U.S. Application Data

(63) Continuation of application No. 18/465,441, filed on Sep. 12, 2023, now Pat. No. 12,352,219, which is a (Continued)

(51) Int. Cl.

| | |
|---|---|
| ***F02C 9/50*** | (2006.01) |
| ***F02C 3/30*** | (2006.01) |
| ***F02C 9/00*** | (2006.01) |

(52) U.S. Cl.

CPC .................. *F02C 9/50* (2013.01); *F02C 3/30* (2013.01); *F02C 9/00* (2013.01); *F05D 2260/99* (2013.01);

(Continued)

(58) Field of Classification Search

CPC ...... F02C 9/00; F02C 9/20; F02C 9/26; F02C 9/263; F02C 9/28; F02C 9/50; F02C 3/30;

(Continued)

(56) References Cited

U.S. PATENT DOCUMENTS

| | | | |
|---|---|---|---|
| 3,921,390 | A | 11/1975 | Stoltman |
| 6,357,219 | B1 | 3/2002 | Dudd, Jr. et al. |

(Continued)

OTHER PUBLICATIONS

International Search Report and Written Opinion dated Apr. 10, 2017, for International Application No. PCT/US2016/064586.

(Continued)

*Primary Examiner* — Steven M Sutherland
(74) *Attorney, Agent, or Firm* — AVEK IP, LLC

(57) ABSTRACT

Systems and methods to control gas turbine firing temperatures during air injection. A method of achieving a desired firing temperature of a gas turbine engine during air injection comprises injecting compressed air into the gas turbine engine using an external source. The external source includes a compressor and a recuperator. The method comprises using a controller of the gas turbine engine to: (a) determine an air injection exhaust bias gain using an inlet temperature of the gas turbine engine; (b) calculate, based on the determined air injection exhaust bias gain and a flow rate of the injected compressed air, an air injection exhaust curve bias; and (c) change a fuel flow of the gas turbine engine by adding the air injection exhaust curve bias to an existing exhaust curve of the gas turbine engine to thereby achieve the desired firing temperature during air injection.

20 Claims, 1 Drawing Sheet

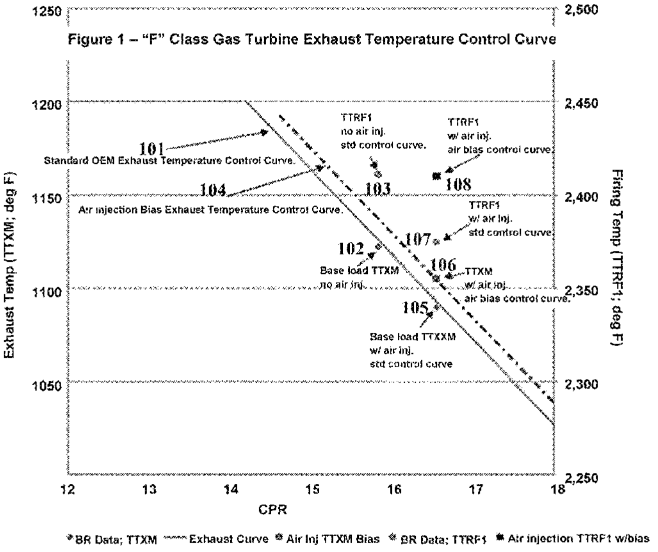

Related U.S. Application Data continuation of application No. 17/232,797, filed on Apr. 16, 2021, now Pat. No. 11,754,003, which is a continuation of application No. 15/367,525, filed on Dec. 2, 2016, now Pat. No. 10,982,599.

(60) Provisional application No. 62/263,057, filed on Dec. 4, 2015.

(52) U.S. Cl.
CPC .... *F05D 2270/083* (2013.01); *F05D 2270/30* (2013.01); *F05D 2270/303* (2013.01)

(58) Field of Classification Search
CPC ............ F05D 2270/03; F05D 2270/06; F05D 2270/061; F05D 2270/083; F05D 2270/112; F05D 2270/30; F05D 2270/303; F05D 2270/304; F05D 2270/313; F05D 2270/44; F05D 2270/71
See application file for complete search history.

(56) References Cited

U.S. PATENT DOCUMENTS

| | | | |
|---|---|---|---|
| 6,481,212 | B2 | 11/2002 | Priestley |
| 12,352,219 | B2 | 7/2025 | Kraft et al. |
| 2008/0178602 | A1 | 7/2008 | Nakhamkin |
| 2013/0125557 | A1 | 5/2013 | Scipio et al. |
| 2014/0090353 | A1 | 4/2014 | Simons et al. |
| 2014/0144124 | A1 | 5/2014 | Mazumder et al. |
| 2014/0250902 | A1 | 9/2014 | Kraft |
| 2014/0260312 | A1 | 9/2014 | Davis, Jr. et al. |
| 2014/0352318 | A1 | 12/2014 | Kraft |
| 2014/0366547 | A1 | 12/2014 | Kraft et al. |
| 2014/0373551 | A1 | 12/2014 | Kraft et al. |
| 2015/0233296 | A1 | 8/2015 | Kraft |
| 2015/0354466 | A1 | 12/2015 | Higashi et al. |
| 2024/0026830 | A1 | 1/2024 | Kraft et al. |

OTHER PUBLICATIONS

Office Action dated Sep. 28, 2020, 14 pages, issued in Japanese Application No. 2018-529054 (w/ EN translation).

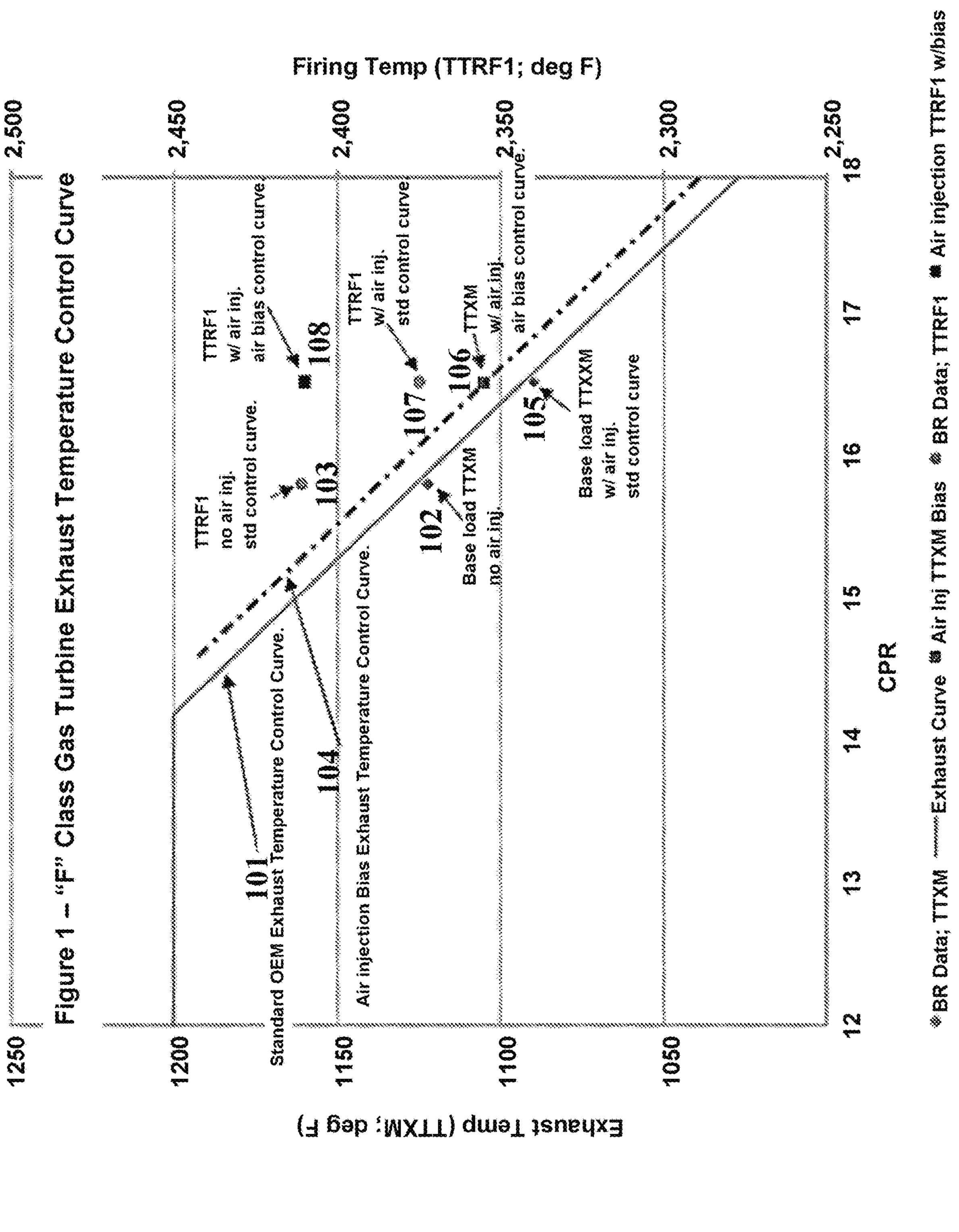
Figure 1 – "F" Class Gas Turbine Exhaust Temperature Control Curve
Firing Temp (TTRF1; deg F)
2,500
2,450
2,400
2,350
2,300
2,250
Exhaust Temp (TTXM; deg F)
1250
1200
1150
1100
1050
CPR
12
13
14
15
16
17
18
101
Standard OEM Exhaust Temperature Control Curve.
104
Air injection Bias Exhaust Temperature Control Curve.
TTRF1
no air inj.
std control curve.
103
102
Base load TTXM
no air inj.
TTRF1
w/ air inj.
air bias control curve.
108
TTRF1
w/ air inj.
std control curve
107
106
TTXM
w/ air inj.
air bias control curve.
105
Base load TTXXM
w/ air inj.
std control curve
BR Data; TTXM
Exhaust Curve
Air Inj TTXM Bias
BR Data; TTRF1
Air injection TTRF1 w/bias

GAS TURBINE FIRING TEMPERATURE CONTROL WITH AIR INJECTION SYSTEM

CROSS-REFERENCE TO RELATED APPLICATIONS

This application is a continuation of U.S. patent application Ser. No. 18/465,441, filed Sep. 12, 2023, set to issue as U.S. Pat. No. 12,352,219 on Jul. 8, 2025, which is a continuation of U.S. patent application Ser. No. 17/232,797, filed Apr. 16, 2021, now U.S. Pat. No. 11,754,003, which itself is a continuation of U.S. patent application Ser. No. 15/367,525, filed Dec. 2, 2016, now U.S. Pat. No. 10,982, 599, which claims the benefit of priority to U.S. Provisional Patent Application No. 62/263,057 filed on Dec. 4, 2015. Each of these applications is herein incorporated by reference in its entirety.

TECHNICAL FIELD

This invention relates generally to electrical power systems, including generating, efficiency and regulation capacity of a gas turbine, and more specifically to an injection system and control system for increasing power output from the gas turbine engine.

BACKGROUND OF THE INVENTION

Gas turbines are one of the most economic, versatile and efficient ways to produce electrical or mechanical power. However, as ambient temperature increases, the power output decreases proportionately due to the linear effect of reduced air density as the temperature of air increases. This produces an economic detriment to gas turbine operators on hot days, when gas turbines are typically dispatched to deliver power during peak demand periods and when energy prices are higher.

Power augmentation technologies such as inlet air conditioning (evaporative cooling or inlet chilling), or steam injection have been suggested in order to increase gas turbine output during hot ambient conditions. Inlet air conditioning, however, may not be attainable when humidity levels are high as higher water content in the turbine combustor outlet gases can have detrimental effect on the engine components.

In order to achieve safe and reliable operation, gas turbines have complex control systems to control the operation of the turbine, while maintaining the health and durability of hot gas path parts. Paramount is the control of the firing temperature, described as the temperature at the inlet first stage rotor of the expander or turbine. Development of high temperature materials, thermal barrier coatings, and cooling designs have allowed continual increases in firing temperature, thereby allowing these components to operate at increasingly higher limits. This, in turn, results in higher output and efficiency per unit mass flow traveling through the gas turbine. However, due to the extreme temperatures in the gas turbine engine, direct temperature measurement of the firing temperature is not practical, and as such, an alternate method is needed to control the gas turbine engine. Common industry practice is to use an "exhaust temperature control curve" where a "target exhaust temperature" exists for each compressor discharge pressure (CDP) or compressor pressure ratio (CPR). This "firing curve" is an empirical formulation, and is a function of CPR and the measured turbine exhaust temperature. The firing curve is designed to allow the gas turbine engine to operate at a constant firing temperature, across all ambient conditions.

Assuming ideal conditions, the relationship between the outlet of the turbine ($T_4$) and turbine inlet $T_3$ (first stage vane of the turbine) can be calculated as an isentropic expansion by the following relationship:

$$\frac{T_4}{T_3} = \left(\frac{P_4}{P_3}\right)^{\frac{k-1}{k}} \quad (1)$$

where k is the ratio of specific heats for the working fluid, T is the absolute temperature (deg. R or deg. K), and P is absolute pressure (psia or Pa).

Equation (1) however, is not sufficient to control the gas turbine exhaust temperature. Turbines are not 100% efficient and often times, cooling air from early compressor stages is bled off and mixed downstream of the first rotor during the expansion process. Consequently, the relationship between the combustor discharge and the turbine exhaust temperature is not calculated by a closed form equation, but by a series of relationships, which take into account, fluid physical properties, cooling air flows and temperature, combustion process, heat transfer coefficients for thermal barrier coatings, internal and film cooling, and mixing losses, etc.

When an additional fluid such as steam is injected into the gas turbine for emissions control or power augmentation, the gas turbine conditions (properties of the combustion gases, and compressor discharge conditions) change. In addition, the real gas constant can change substantially when steam is injected. The same exhaust control curve that was used to control the gas turbine without injection is no longer valid, and the actual firing temperature will change if the same curve is used when injecting additional mass flow. If the existing exhaust temperature control curve is used, then the firing temperature will drop as well as the exhaust temperature. This type of operation is called operating on the "dry curve." As a common practice, Original Equipment Manufacturer (OEM) control systems employ control curve bias curves, when steam is injected into the gas turbine. This bias mainly accounts for the changes in real gas properties, and lowers the firing and exhaust temperature even further to account for the more aggressive steam heat transfer properties in order to minimize the negative impact on turbine parts life. In this case, the gas turbine is said to be operating on the "wet curve" which reduces firing temperature, beyond the reduction that would normally occur if operating on the dry curve, accounting for the mass flow thermodynamic properties (k) and intentionally dropping the firing temperature to preserve turbine parts life.

Similar to steam injection, as dry air is injected into the compressor wrapper, the compressor discharge pressure increases due to increased flow resistance through the first stage of the turbine, and therefore back pressures the compressor, resulting in a higher CPR. With a "dry curve" exhaust temperature control curve, this appears to be operation on a colder day since CPR has increased. However, the compressor discharge temperature, and the actual mass flow through the compressor are not the same, as those of a colder day at the same CPR. For example, in one such simple cycle industrial gas turbine operating at sea level on a 95 deg. F day, the compressor inlet flow (CIF) is 890 pounds per second, with a CPR of 14.0, and the compressor discharge temperature (CDT) of about 800 deg. F. Assuming air is injected into the compressor wrapper, thus increasing CPR to 14.8, the CDT increases to 831 deg. F due to a back pressuring effect, or higher pressure ratio, on the compressor. An increase in CPR to 14.8 is equivalent to the CPR expected on a 59 deg. F day without injection. As a result of injecting dry air, CPR increases, resulting in a lower exhaust temperature on the "standard dry" control curve. However, since CDT is higher than on a colder day at the same CPR, the effect will be to further increase exhaust temperature, which then results in a lower fuel flow to reduce the firing temperature further. The lower fuel flow required to meet the required exhaust temperature at the given CPR results in a reduction in actual firing temperature since the gas path mixing temperatures have increased due to the higher CDT. This also results in reducing the actual combustion zone reaction temperature. Dry low NOx combustion systems operate at lean (low) reaction zone temperatures which limit and control NOx emissions, but a further reduction in this combustion temperature results in conditions which are near lean blow out and where carbon monoxide emissions rise rapidly. As a result of injecting dry air, operation on the "standard dry" the exhaust temperature control curve results in an "under fire" condition because the compressor flow and mix temperatures are different from the empirical formulations that are the basis of the standard control curve, resulting in lower efficiency and output. Since the injected fluid is just air, there are no harsh heat transfer effects to counter balance as well as no difference in the thermal properties (as there is with steam). Therefore, the firing temperature can be held constant without any significant effect on turbine parts life.

SUMMARY

The current invention provides several options, depending on specific plant needs, to improve the efficiency and power output of a plant at low loads, and to reduce the lower limit of power output capability of a gas turbine while also increasing the upper limit of the power output of the gas turbine, thus increasing the capacity and regulation capability of a new or existing gas turbine system.

The current invention describes a way of operating a gas turbine engine with hot dry air injection that is a function of the amount and temperature of dry air being injected into the gas turbine engine.

One aspect of the present invention relates to methods and systems that control an exhaust temperature bias that is a function of the incremental air flow added to the gas turbine engine.

Another aspect of the present invention relates to methods and systems used to control the firing temperature while injecting various quantities of hot compressed air into the gas turbine engine.

Another aspect of the present invention relates to methods and systems that maximize the efficiency and power output of a gas turbine engine while injecting hot compressed air into the gas turbine engine.

In an embodiment of the present invention, a method of operating a gas turbine engine with an air injection system according to an exhaust temperature control curve is provided. The method comprises the steps of determining an exhaust temperature for the gas turbine engine when operating without air injection, then determining a firing temperature for the gas turbine engine when operating without air injection and providing a source of compressed air that is additive to a gas turbine compressor flow and injected into the gas turbine engine. Finally, the method determines a bias to be added to the exhaust temperature control curve such that a desired firing temperature with air injection is reached.

In an alternate embodiment of the present invention, a method of operating a gas turbine engine equipped with an air injection system is disclosed. The method comprises the steps of controlling fuel flow of the gas turbine engine with an exhaust temperature control curve and determining an exhaust temperature for the gas turbine engine when operating without air injection. Then, the firing temperature for the gas turbine engine when operating without air injection is determined and a source of compressed air that is additive to a gas turbine compressor flow is provided and injected into the gas turbine engine. A bias is then determined where the bias to be added to the exhaust temperature control curve results in a fuel flow change to the gas turbine engine such that a desired firing temperature is achieved.

In another embodiment of the present invention, a method of controlling a gas turbine engine above a current base load power level with an air injection system is provided where the method comprises the steps of measuring the incremental air flow being injected into the gas turbine engine, calculating an expected incremental power increase as a function of an amount of air flow being added by the air injection system, and reestablishing a new base load power level of one hundred percent equal to a sum of the expected incremental power plus the current base load power level prior to air injection.

In an additional embodiment, a method of achieving a desired firing temperature of a gas turbine engine during air injection comprises preprogramming into a controller of the gas turbine engine a constant associated with air injection. The method includes injecting compressed air into the gas turbine engine using an external source. The method comprises using the controller to: (a) determine an air injection exhaust bias gain using each of the constant and an inlet temperature of the gas turbine engine; (b) calculate, based on the determined air injection exhaust bias gain and a flow rate of the injected compressed air, an air injection exhaust curve bias; and (c) change a fuel flow of the gas turbine engine by adding the air injection exhaust curve bias to an existing exhaust curve of the gas turbine engine to thereby achieve the desired firing temperature during air injection.

In yet another embodiment, a method of operating a gas turbine engine equipped with an air injection system at a desired firing temperature comprises determining an exhaust temperature of the gas turbine engine when the gas turbine engine is operating without air injection. The method includes calculating a firing temperature of the gas turbine engine when the air injection system is not injecting air into the gas turbine. The method comprises injecting air into the gas turbine engine using the air injection system. The method includes using a controller of the gas turbine engine to: (a) determine a bias to be added to an exhaust temperature control curve of the gas turbine engine; and (b) alter a fuel flow of the gas turbine engine based on the determined bias to achieve the desired firing temperature during air injection. The desired firing temperature is generally equal to the firing temperature.

In still another embodiment, a method of achieving a desired firing temperature of a gas turbine engine during air injection comprises injecting compressed air into the gas turbine engine using an external source. The external source includes a compressor and a recuperator. The method comprises using a controller of the gas turbine engine to: (a) determine an air injection exhaust bias gain using an inlet temperature of the gas turbine engine; (b) calculate, based on the determined air injection exhaust bias gain and a flow rate of the injected compressed air, an air injection exhaust curve bias; and (c) change a fuel flow of the gas turbine engine by adding the air injection exhaust curve bias to an existing exhaust curve of the gas turbine engine to thereby achieve the desired firing temperature during air injection.

BRIEF DESCRIPTION OF THE SEVERAL VIEWS OF THE DRAWINGS

The present invention is described in detail below with reference to the attached drawing figures, wherein:

FIG. 1 is a graphical expression of a firing temperature curve for a gas turbine engine depicting control curves with and without air injection.

DETAILED DESCRIPTION

The present invention will now be described with respect to FIG. 1. The fuel flow for many gas turbine engines at full load, or base load are controlled with an exhaust temperature control curve. FIG. 1 represents exhaust temperature control curves establishing a relationship between exhaust temperature on the left axis and compressor pressure ratio (CPR) on the horizontal axis. A representative standard OEM gas turbine exhaust control curves is shown as 101 in FIG. 1. For a nominal base load operation, a representative gas turbine engine is operating at point 102, with a CPR of 15.8, an exhaust temperature (or TTXM) of 1127 deg. F and a firing temperature (or TTRF1) of 2410 deg. F (as shown on the right side axis).

When a mass flow, such as air, is injected into the compressor exit section of the gas turbine, the CPR increases accordingly. When operating on the dry curve (with air injection), the operating point would move to 105 which, for the example disclosed herein, is a CPR of 16.3, an exhaust temperature (or TTXM) of 1095 deg. F. and a firing temperature (or TTRF1) of 2385 deg. F., both lower due to the additional mass flow. The present invention employs an air injection system such as an auxiliary, external system for supplying the additional air being injected into the gas turbine engine. When such additional air is provided, it may be at a lower temperature than that of the air from the engine compressor. For example, air can be provided at 50-100 deg. F. cooler than the compressor discharge air. However, when cooler air is added to the gas turbine engine, the standard control curve on which the gas turbine engine operates does not account for this temperature difference.

The fluid being injected is air and not steam. Rather than reducing the firing temperature further to help preserve hot gas path parts life, a new curve 104 called an air injection bias is introduced to boost the reduced firing temperature back to the original 2410 deg. F. Through the air injection bias curve 104, the bias is shifted up to maintain the original firing temperature during air injection. Therefore, instead of shifting to a lower firing temperature (from 103 to 107), by applying the bias the operating point is shifted back to the same firing temperature 108 as without the air injection.

One such source of compressed air for adding to the compressor discharge air is compressed air produced by an external compressor that is powered by a fueled engine. The applicant of the present invention has developed this auxiliary air source technology which is described in more detail in co-pending patents application Ser. Nos. 14/350,469, 14/351,245, 14/329,340, 14/329,433, and 14/462,000. Air produced from this system can be provided to the gas turbine engine at an elevated temperature and pressure similar to that of the compressor discharge air.

The effect of this supplemental air injection is shown graphically in FIG. 1. To correct for this “underfire” condition while injecting heated dry air, an exhaust temperature control bias algorithm is developed as a function of the injection flow to bring the firing temperature up to the intended constant firing temperature. Table 1 below shows the improvement in heat rate (HR) versus percent air injection when the air bias curve is employed to meet a constant TTRF1 of 2420 deg. F.

TABLE 1

HR Improvement Vs. Air Injection Rate on “Dry” Curve and with Air Injection Bias Correction

| Standard Dry Curve | | | | | Air Injection Bias Correction | | | | |
|---|---|---|---|---|---|---|---|---|---|
| % DAI | SC Net HR dry curve | % HR Imp | TTXM | TTRF1 | % DAI | SC Net HR w/air bias curve | % HR Imp | TTXM | TTRF1 |
| 0.0% | 9457 | 0.00% | 1127 | 2420 | 0.0% | 9525 | 0.00% | 1127 | 2420 |
| 1.4% | 9452 | −0.05% | 1122 | 2416 | 1.4% | 9400 | −1.31% | 1124 | 2420 |
| 3.3% | 9391 | −0.70% | 1115 | 2406 | 3.3% | 9325 | −2.10% | 1121 | 2420 |
| 4.2% | 9361 | −1.02% | 1112 | 2404 | 4.2% | 9274 | −2.64% | 1119 | 2420 |
| 5.5% | 9313 | −1.53% | 1103 | 2395 | 5.5% | 9199 | −3.42% | 1114 | 2420 |
| 6.7% | 9282 | −1.85% | 1095 | 2385 | 6.7% | 9136 | −4.09% | 1110 | 2420 |

As one skilled in the art can appreciate and calculate, when air injection is introduced the CPR increases, resulting in a small temperature increase in the air that is used to cool the hot gas path parts. Theoretically this will also slightly increase the hot gas path parts metal temperature resulting in reduced life. However, a similar issue happens to a gas turbine engine operating on a hot day and the original equipment manufacturer does not debit the life of the components as a result. As one skilled in the art can appreciate, it would be well understood to introduce a “wet curve” bias that took this into account and would result in constant metal temperature (and life) of the most critical components in the hot gas path. To quantify this effect, a 5% air injection into the gas turbine will result in metal temperatures equal to the gas turbine engine operating on a 15 deg. F hotter ambient day, but without the injection.

There are different scenarios for how the gas turbine is controlled at base load and maximum firing temperature. Each scenario will result in a slightly different exhaust control curve bias implementation. One such scenario is when the gas turbine engine is controlled with exhaust curves as described above. In this case, the air injection bias is a function of the amount of air injection being added to the gas turbine. This bias (in deg. F or deg. C) is added to the baseload exhaust curve during air injection. Specifically, the air injection exhaust curve bias=air injection flow rate×air injection exhaust bias gain+air injection exhaust bias offset (or utilizing a y=mx+b approach), where the air injection bias gain=gas turbine inlet temperature×gas turbine inlet temperature gain+air injection exhaust bias compensation offset, where this compensation offset is the portion of the bias gain not influenced by the gas turbine inlet temperature and is a function of the air injection temperature. The air injection exhaust bias gain has a maximum and minimum value depending on the type of gas turbine engine. The air injection flow rate is measured by a flow meter or calculated using pressure transducers and a Cv curve. For example, for a flow rate increase of 10 pounds per second of air injection results in a 2.1 degree F. bias (where air injection exhaust curve bias=10 (the air injection flow rate)×0.21 (the air injection exhaust bias gain)+0 (air injection exhaust bias offset)) where the exhaust bias gain=gas turbine inlet temperature×0 (gas turbine inlet temperature gain)+0.21 (air injection exhaust bias compensation offset). Each of these gains and offset values are preprogrammed values entered into a control system and are selected when predetermined criteria are met. That is, during operation, the controller reads in gas turbine inlet temperature measurements and uses the constants to determine the air injection exhaust bias gain. Once calculated, the controller reads in the measured or calculated air injection flow rate and uses this value to determine air injection exhaust curve bias. The bias is then added to the existing turbine exhaust curve.

Depending on the engine model and hardware configuration, the offsets and gains used for the air injection exhaust curve bias will change. That is, control logic varies between different gas turbine manufacturers. Some manufacturers use gas turbine firing temperature and gas turbine exhaust temperature to control the engine. Other manufacturers control fuel splits using a normalized load curve, where a normalized load curve represents the actual load (in MW) divided by the theoretical load (in MW). The theoretical full load curve (MW at 100% load v. inlet temperature) is adjusted over time to account for engine degradation and maintenance. However, the theoretical full load curve needs to be adjusted to account for the increase in output associated with this air injection. For example, if the air injection results in 5% increase in output at full load, an unadjusted normalized load curve will calculate out to 105%. However, after the MW bias is applied to the normalized load curve, it will calculate out to 100%.

In an alternate embodiment of the present invention, the gas turbine engine is controlled with normalized load curves. For gas turbine engines which are controlled based on a normalized load, additional control modifications may be necessary to help with combustion stability. More specifically, the normalized load curve bias=air injection flow rate×air injection MW gain+air injection MW bias offset where the air injection MW gain=gas turbine inlet temperature×gas turbine inlet temperature MW compensation+air injection MW compensation offset.

Depending on the engine model and hardware configuration, the offsets and gains used for the air injection exhaust curve bias will change. Yet another scenario is when the gas turbine is controlled with a max load control parameter. In this case, the operation is the same as the previous embodiment discussed above, but to allow the gas turbine to produce additional power and not be limited by a max MW set point in the controls.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A method of achieving a desired firing temperature of a gas turbine engine during air injection, comprising:
- injecting compressed air into said gas turbine engine using an external source; and
- using a controller of said gas turbine engine to:
  - determine an air injection exhaust bias gain using an inlet temperature of said gas turbine engine;
  - calculate, based on said air injection exhaust bias gain and a flow rate of said compressed air, an air injection exhaust curve bias; and
  - operate said gas turbine engine along said air injection exhaust curve bias to achieve said desired firing temperature during air injection.

2. The method of claim 1, further comprising using a type of said gas turbine engine to determine said air injection exhaust bias gain.

3. The method of claim 1, further comprising heating said compressed air in a recuperator prior to injecting said compressed air into said gas turbine engine.

4. The method of claim 1, wherein said desired firing temperature during air injection is the same as a firing temperature of said gas turbine engine without air injection.

5. The method of claim 1, further comprising adjusting said air injection exhaust curve bias during changing ambient conditions to maintain said desired firing temperature.

6. The method of claim 1, further comprising injecting said compressed air into said gas turbine engine at a temperature lower than a temperature of air discharged by a gas turbine compressor.

7. The method of claim 1, further comprising:
- preprogramming a plurality of constants associated with air injection into said controller;
- selecting a selected constant from said plurality of constants based on a type of said gas turbine engine; and
- using said selected constant to determine said air injection exhaust bias gain.

8. A method of operating a gas turbine engine equipped with an air injection system at a desired firing temperature, comprising:
- calculating a firing temperature of said gas turbine engine when said air injection system is not injecting air into said gas turbine engine;
- injecting air into said gas turbine engine at an air injection flow rate using said air injection system; and
- using a controller of said gas turbine engine to:
  - determine a bias to be added to an exhaust temperature control curve of said gas turbine engine based on a gas turbine inlet temperature; and operate said gas turbine engine along a curve that is a function of said bias and said exhaust temperature control curve to achieve said desired firing temperature during air injection.

9. The method of claim 8, further comprising using said exhaust temperature control curve to modify a fuel flow of said gas turbine engine.

10. The method of claim 8, further comprising measuring an exhaust temperature of said gas turbine engine.

11. The method of claim 8, wherein said air injection system comprises a compressor and a recuperator.

12. The method of claim 8, wherein a temperature of air injected into said gas turbine engine is lower than a temperature of air discharged by a gas turbine compressor.

13. The method of claim 8, further comprising adjusting said bias during changing ambient conditions to maintain said desired firing temperature.

14. A method of achieving a desired firing temperature of a gas turbine engine during air injection, comprising:

injecting compressed air into said gas turbine engine using an external source; and using a controller of said gas turbine engine to:

calculate an air injection exhaust curve bias based on an air injection exhaust bias gain and an inlet temperature of said gas turbine engine; and operate said gas turbine engine along said air injection exhaust curve bias to achieve said desired firing temperature during air injection.

15. The method of claim 14, further comprising using said air injection exhaust curve bias to modify a fuel flow of said gas turbine engine.

16. The method of claim 14, further comprising heating said compressed air in a recuperator prior to injecting said compressed air into said gas turbine engine.

17. The method of claim 14, wherein said desired firing temperature during air injection is the same as a firing temperature of said gas turbine engine without air injection.

18. The method of claim 14, further comprising adjusting said air injection exhaust curve bias during changing ambient conditions to maintain said desired firing temperature.

19. The method of claim 14, further comprising injecting said compressed air into said gas turbine engine at a temperature lower than a temperature of air discharged by a gas turbine compressor.

20. The method of claim 14, wherein said external source comprises a recuperator and a compressor for providing said compressed air.

* * * * *